US008368433B2

(12) United States Patent
Lee et al.

(10) Patent No.: US 8,368,433 B2
(45) Date of Patent: Feb. 5, 2013

(54) TRANSISTOR MODULE AND TRANSISTOR DRIVING MODULE

(75) Inventors: Li-Min Lee, New Taipei (TW); Shian-Sung Shiu, New Taipei (TW); Chung-Che Yu, New Taipei (TW); Si-Min Wu, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 159 days.

(21) Appl. No.: 13/092,142

(22) Filed: Apr. 21, 2011

(65) Prior Publication Data

US 2012/0038391 A1 Feb. 16, 2012

(30) Foreign Application Priority Data

Aug. 16, 2010 (CN) .......................... 2010 1 0257495

(51) Int. Cl.
*H03K 3/01* (2006.01)

(52) U.S. Cl. ........ 327/109; 327/110; 327/387; 327/410; 363/56.04; 363/56.1

(58) Field of Classification Search .......... 327/108–112, 327/387–388, 407–410, 427, 434, 437; 363/56.01, 363/56.03, 56.04, 56.07, 56.1
See application file for complete search history.

(56) References Cited

U.S. PATENT DOCUMENTS

| | | | | |
|---|---|---|---|---|
| 4,910,416 | A * | 3/1990 | Salcone | 327/374 |
| 7,782,037 | B2 * | 8/2010 | Ohtani et al. | 323/284 |

* cited by examiner

*Primary Examiner* — An Luu
(74) *Attorney, Agent, or Firm* — Jianq Chyun IP Office

(57) ABSTRACT

The present invention discloses a transistor driving module, coupling to a converting controller, to driving a high side transistor and a low side transistor connected in series, wherein one end of the high side transistor is coupled to an input voltage and one end of the low side transistor is grounded. The transistor driving module comprises a high side driving unit, a low side driving unit, a current limiting unit and an anti-short through unit. The high side driving unit generates a high side driving signal to turn the high side transistor on according to a duty cycle signal, and the low side driving unit generates a low side driving signal turn the low side transistor on according to the high side driving signal. The current limiting unit is coupled to the high side transistor and the high side driving unit, and generates a current limiting signal when a current flowing through the high side transistor higher than a current limiting value. The high side driving unit is stopped to generate the high side driving signal when receiving the current limiting value. The anti-short through unit is coupled to the high side driving unit and the low side driving unit to control the generations of the high side driving signal and the low side driving signal to have the timings of the high side driving signal and the low side driving signal non-overlapped.

21 Claims, 2 Drawing Sheets

TRANSISTOR MODULE AND TRANSISTOR DRIVING MODULE

CROSS-REFERENCE TO RELATED APPLICATION

This application claims the priority benefit of China application serial no. 201010257495.8, filed Aug. 16, 2010. The entirety of the above-mentioned patent application is hereby incorporated by reference herein and made a part of this specification.

BACKGROUND OF THE INVENTION (1) Field of the Invention

The present invention relates to a transistor module and a transistor driving module. More particularly, the invention relates to a transistor module and a transistor driving module with over current protection.

(2) Description of the Prior Art

FIG. 1 is a schematic diagram of a conventional buck converter. Referring to FIG. 1, the buck converter comprises a controller 10, a transistor switch 20 with an built-in driving circuit, an inductance L, an output capacitance C, and a voltage feedback circuit VD, to transfer an input voltage Vin into an output voltage Vout to drive a load Ld. The controller 10 receives a voltage feedback signal VFB which is generated by the voltage feedback circuit VD, and generates a pulse width modulation signal pwm.

The transistor switch 20 includes a pulse width control circuit 25, a high side driving circuit 30, a low side driving circuit 35, a high side transistor M1, and a low side transistor M2. The pulse width control circuit 25 receives the pulse width modulation signal pwm to the turn-on and turn-off the high side transistor M1 and the low side transistor M2 accordingly. Therefore, the power delivered by the input voltage Vin through the transistor switch 20 can be controlled and converted through the inductance L and the output capacitance C, such that the output voltage Vout is stabilized at a predetermined voltage value. In order to make the high side transistor M1 be turned-on and turned-off accurately, a bootstrap circuit could be added. The bootstrap circuit includes a diode D and a boost capacitance Cboot which are coupled in series between the input voltage Vin and the connecting point between the high side transistor M1 and the low side transistor M2. Thus, the bootstrap circuit can offer a potential, higher than a potential of the connecting point between the high side transistor M1 and the low side transistor M2 by a potential approximates the input voltage Vin, to the high side driving circuit 30. Therefore, the high side driving circuit 30 can accurately turn-on and turn-off the high side transistor M1.

The design of the transistor switch with built-in driving circuit makes the controller 10 need not to be coupled to the input voltage Vin so as to decrease the withstand voltage request. So, the cost of the controller 10 can be decreased. However, the controller 10 and the transistor switch 20 are two independent packages, such that a delay-time may exist between two independent packages. Due to that the controller 10 and transistor switch 20 are communicated by the pulse width modulation signal pwm. The controller 10 cannot understand the situations of the high side transistor M1 and the low side transistor M2 accurately, such that the high side transistor M1 and the low side transistor M2 are usually burned out because of the over current in the actual application.

SUMMARY OF THE INVENTION

In the foregoing related art, the transistor switch with built-in driving circuit has the problem of being burned out due to over current. The invention uses a method of current limiting or over current protection to protect the transistor from over current.

To accomplish the aforementioned and other objects, an exemplary embodiment of the invention provides a transistor driving module, coupled to a converting controller, to drive a high side transistor and a low side transistor connected in series, wherein the high side transistor is coupled to an input voltage and the low side transistor is grounded. The transistor driving module comprises a high side driving unit, a low side driving unit, a current limiting unit and an anti-short through unit. The high side driving unit generates a high side driving signal to turn the high side transistor on according to a duty cycle signal of the converting controller, and the low side driving unit generates a low side driving signal to turn the low side transistor on according to the high side driving signal. The current limiting unit is coupled to the high side transistor and the high side driving unit, and generates a current limiting signal when a current flowing through the high side transistor higher than a current limiting value. The high side driving unit is stopped to generate the high side driving signal when receiving the current limiting value. The anti-short through unit is coupled to the high side driving unit and the low side driving unit to control the generations of the high side driving signal and the low side driving signal to have the timings of the high side driving signal and the low side driving signal non-overlapped.

Furthermore, another exemplary embodiment of the invention provides a transistor module which is coupled to an input voltage, to transmitting a power to an output end according to a duty cycle signal of a converting controller. The transistor module comprises a high side transistor, a low side transistor, a high side driving unit, a low side driving unit, a current limiting unit, and an anti-short through unit. The high side transistor includes a first end, a second end, and a first control end. Wherein, the first end is coupled to the input voltage. The low side transistor includes a third end, a fourth end, and a second control end. Wherein, the third end is coupled to the second end of the high side transistor. The fourth end is coupled to a ground. The high side driving unit is coupled to the first control end of the high side transistor, and generates a high side driving signal to turn the high side transistor on according to the duty cycle signal. The low side driving unit is coupled to the second control end of the low side transistor, and generates a low side driving signal to turn the low side transistor on according to the high side driving signal. The current limiting unit is coupled to the first end and the second end of the high side transistor, and generates a current limiting signal when a voltage difference between the first end and the second end higher than a current limiting voltage value to stop the high side driving unit generating the high side driving signal. The anti-short through unit is coupled to the high side driving unit and the low side driving unit to control the generations of the high side driving signal and the low side driving signal to have the timings of the high side driving signal and the low side driving signal non-overlapped.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
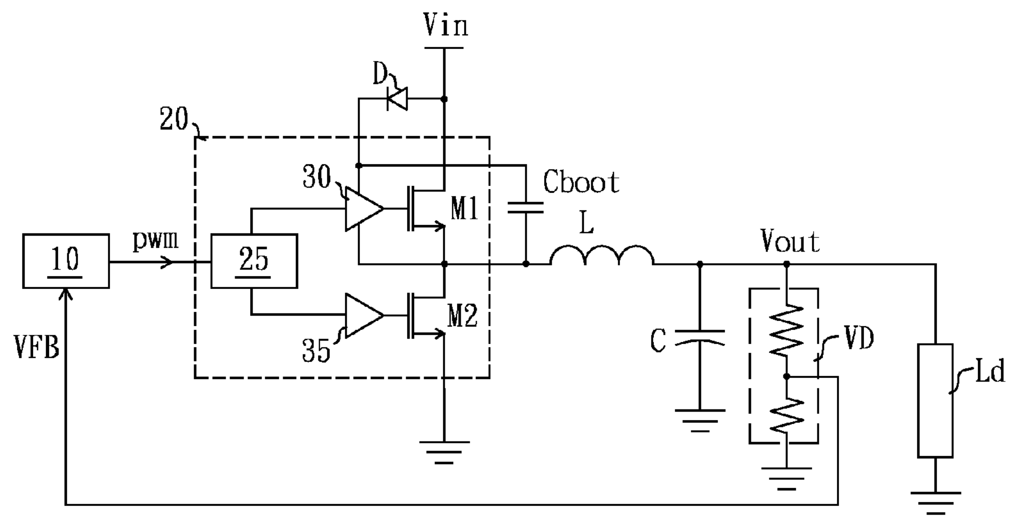
FIG. 1 is a schematic diagram of a conventional buck converter.
Figure 2:
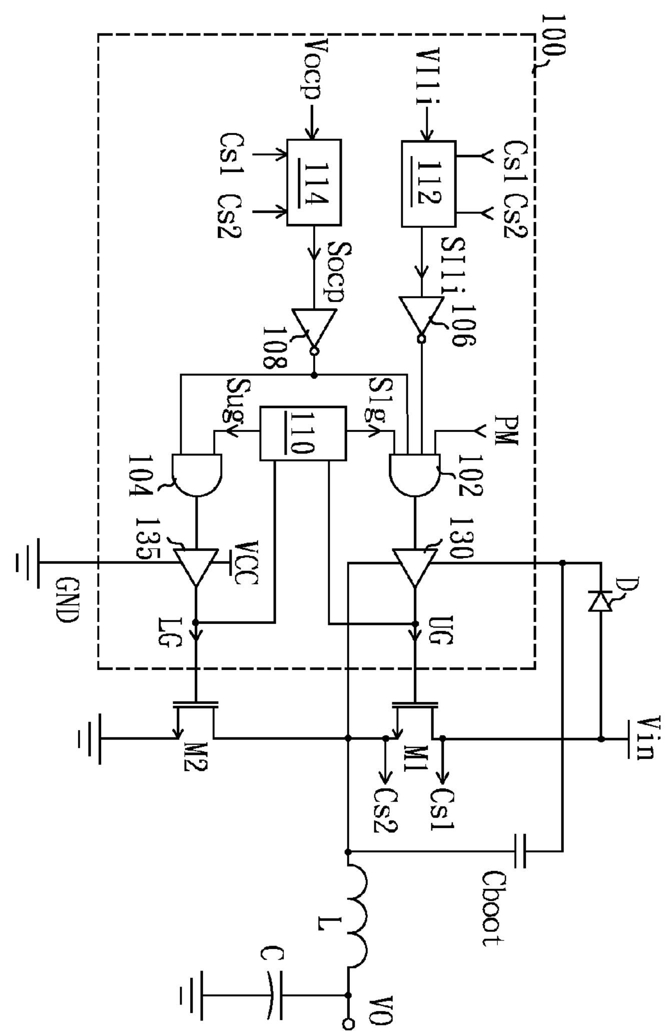
FIG. 2 is a schematic diagram of parts of the converting circuit according to an embodiment of the invention.

FIG. 2 is a schematic diagram of parts of the converting circuit according to an embodiment of the invention. Referring to FIG. 2, the converting circuit comprises a converting controller (not shown), a transistor driving module 100, an inductance L, an output capacitance C, a high side transistor M1, and a low side transistor M2, to transfer an electric power from an input voltage Vin into an output voltage VO. The high side transistor M1 and the low side transistor M2 are connected in series between the input voltage Vin and a ground. Wherein, the high side transistor M1 comprises a first end, a second end, and a first control end. The low side transistor M2 comprises a third end, a fourth end, and a second control end. The first end of the high side transistor M1 is coupled to the input voltage Vin and the second end thereof is coupled to the third end of the low side transistor M2. The fourth end of the low side transistor M2 is coupled to the ground. The transistor driving module 100 is coupled to the converting controller to receive a duty cycle signal PM of the converting controller to generate a high side driving signal UG and a low side driving signal LG, so as to turn-on and turn-off the high side transistor M1 and the low side transistor M2 separately. Wherein, the converting controller generates the duty cycle signal PM according to the output of the output voltage VO (e.g. output voltage or output current, etc). The duty cycle signal PM can be a pulse width modulation signal, a pulse frequency modulation signal, or combination thereof.

The transistor driving module 100 is packaged in a single package structure, comprising a first AND gate 102, a second AND gate 104, a first inverter 106, an anti-short through unit 110, a current limiting unit 112, an high side driving unit 130, and a low side driving unit 135. The first AND gate 102 receives the duty cycle signal PM to generate a high level signal to the high side driving unit 130, such that the high side driving unit 130 generates the high side driving signal UG to turn-on the external high side transistor M1. The anti-short through unit 110 receives the high side driving signal UG, and generates a low side turn-on start signal Sug with high level in a predetermined time period after the end of the high side driving signal UG which is generated by the high side driving unit 130 (i.e. the time point of the high side transistor M1 being turned from on to off). The second AND gate 104 generates a signal with high level to low side driving unit 135 after receiving the low side turn-on start signal Sug, such that the low side driving unit 135 generates the low side driving signal LG and then turns-on the external low side transistor M2. The anti-short through unit 110 also receives the low side driving signal LG, and generates a high level of a high side turn-on start signal Slg in a predetermined time period after the end of the low side driving signal LG which is generated by the low side driving unit 135 (i.e. the time point of the low side transistor M2 being turned from on to off). The first AND gate 102 receives the high side turn-on start signal Slg. When the high side turn-on start signal Slg and the duty cycle signal PM are all high level, the first AND gate 102 outputs a signal with high level, such that the high side driving unit 130 generates the high side driving signal UG. By the anti-short through unit 110, the timings of the high side driving signal UG and the low side driving signal LG have not overlap. It means that a dead time exists between the conducting cycles of the high side transistor M1 and the low side transistor M2, so as to avoid the "short-through" phenomenon. Furthermore, the invention may increase a bootstrap circuit, comprising a diode D and a boost capacitance Cboot coupled in series between the input voltage Vin and the connecting point of the high side transistor M1 and the low side transistor M2. The boost capacitance Cboot can offer a potential higher than the connecting point of the transistor M1 and the low side transistor M2 to the high side driving unit 130, for accurately turning on and turning off the high side transistor M1.

The current limiting unit 112 is coupled to the first end and the second end of the high side transistor M1 to detect the current flowing through the high side transistor M1. The high side transistor M1 has an on-resistance. When the current flows through the high side transistor M1, a voltage difference exists between the first end and the second end of the high side transistor M1. If the voltage difference is higher than a current limiting voltage value VIli, it represents that the current flowing through the high side transistor M1 is higher than a current limiting value. At this moment, the current limiting unit 112 generates a current limiting signal Sift with high level, which is inverted by the first inverter 106 and then inputted into the first AND gate 102, to stop the high side driving unit 130 generating the high side driving signal UG. So, the burnout problem of the high side transistor M1 can be avoided.

Some causes make the current of the high side transistor M1 still raise a period of time continuously after the high side transistor M1 reaching the current limiting value, such as time delay between circuits, parasitic elements in circuits, noise or abnormal circuit. Therefore, the current may exceed the withstand current of the high side transistor M1 or low side transistor M2. In order to avoid the above problem, the transistor driving module 100 can add an over current protection unit 114 extra. The over current protection unit 114 is coupled to the first end and the second end of the high side transistor M1 to detect the current flowing through the high side transistor M1. If the different between the voltage signal Cs1 and Cs2 (i.e. the voltage difference of the first end and the second end) is higher than an over current voltage value Vocp, it represents that the current flowing through the high side transistor M1 is higher than an over current value. At the moment, the over current protection unit 114 generates an over current signal Socp with high level. Preferredly, the over current voltage value Vocp is higher than the current limiting voltage value VIli. The over current signal Socp is inverted into low level through a second inverter 108 and then inputted into the first AND gate 102 and the second AND 104 to separately stop the high side driving unit 130 and the low side driving unit 135 generating the high side driving signal UG and the low side driving signal LG until the transistor driving module 100 is restarted. Thus, the burnout problem of the high side transistor M1 can be avoided.

Figure 3:
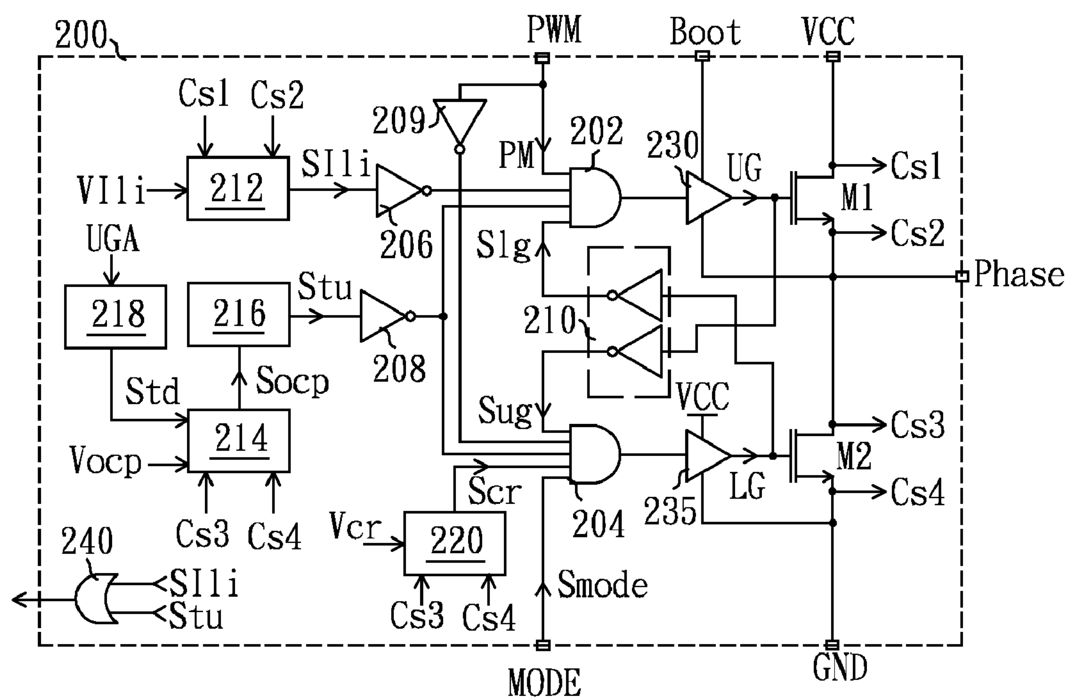
FIG. 3 is a schematic diagram of a transistor module according to an embodiment of the invention.

FIG. 3 is a schematic diagram of a transistor module according to an embodiment of the invention. Compared with the transistor driving module 100 shown in FIG. 2, the present embodiment packages the high side transistor M1 and the low side transistor M2 and the transistor driving module in the same package structure. The transistor module 200 includes a first AND gate 202, a second AND gate 204, a first inverter 206, a driving switch unit 209, an anti-short through unit 210, a current limiting unit 212, a high side driving unit 230, a low side driving unit 235, a high side transistor M1, and a low side transistor M2. The first end of the high side transistor M1 is coupled to an input voltage Vin through an input power pin VCC. The second end of the high side transistor M1 is coupled to the third end of the low side transistor M2 and connected to a connecting point pin Phase. The fourth end of the low side transistor M2 is coupled to a ground by a ground pin GND. The high side driving unit 230 is coupled to a bootstrap circuit (not shown) by a boost pin Boot. The AND gate 202 receives the duty cycle signal PM of the converting controller (not shown) through a control signal pin PWM. The driving switch unit 209 may be an inverter, inverting the duty cycle signal PM that then inputting into the second AND gate 204, such the first AND gate 202 and the second AND gate 204 all respectively generate signals, whose phases are reverse with each other. Beside from that, the anti-short through unit 210 may be composed of two inverters. One inverter thereof inverts the high side driving signal UG that is then inputted into the second AND gate 204. Another inverter thereof inverts the low side driving signal LG that is then inputted into the first AND gate 202. Such that the conducted timings of the high side transistor M1 and the low side transistor M2 are staggered with each other, so as to protection the high side transistor M1 and the low side transistor M2 from short-through. The operation of others circuit in the present embodiment are similar to the transistor driving module shown in FIG. 2, so not repeat here. Next, only the differences between the two embodiments are described as follows.

In the present embodiment, the over current protection unit 214 is coupled to the third end and the fourth end of the low side transistor M2 to detect the current flowing through the low side transistor M2. If the voltage difference between the voltage signal Cs3 and Cs4 (i.e. the voltage drop of the third end and the fourth end) is higher than an over current voltage value Vocp, it represents the current flowing through the low side transistor M2 is higher than an over current value. At this moment, the over current protection unit 214 generates an over current signal Socp with high level continuously. Due to the fourth end of the low side transistor M2 is coupled to the ground, the transistor module 200 can determine the over current condition more accurately by detecting the low side transistor M2 due to the interference of noise in the circuits being reduced, compared with that detecting the high side transistor M1. From a time interval exists a time point of the high side transistor M1 being turned-off to a time point of the low side transistor M2 being turned-on, which is called dead time. A voltage spike at the connecting point Phase between the high side transistor M1 and the low side transistor M2, generated during the dead time from the high side transistor M1 turned off to the low side transistor M2 turned on, influences the accuracy of the over current determination. In order to avoid the problem, the transistor module 200 may add an operation suspending unit 218 extra. The operation suspending unit 218 is coupled to the over current protection unit 214 and the high side driving unit 230, and generates an operation suspending signal Std to the over current protection unit within a period of a predetermined suspending time from that when the operation suspending unit 218 detects the end of the high side driving signal UG (i.e. the time point of the high side transistor M1 which is turned from on to off). Preferredly, the operation suspending unit 218 generates the operation suspending signal Std except for when the low side driving signal LG is at high level to ensure the detecting without any noise due to the switching. The over current protection unit 214 stops the operation when receiving the operation suspending signal Std.

Beside from that, a counting unit 216 may be added extra to count the number of the over current signal Socp which is generated by the over current protection unit 214. When the number of the over current signal Socp reaches a predetermined value, the counting unit 216 generates a protection signal Stu with high level. The protection signal Stu is inverted to low level through a second inverter 208 and then inputted into the first AND gate 202 and the second AND gate 204 to stop the high side driving unit 230 and the low side driving unit 235 generating the high side driving signal UG and the low side driving signal LG separately until the transistor module 200 is restarted. So, through the counting unit 216, the erroneous determination of the over current, due to noise, etc, could be filtered out.

Certainly, the current limiting unit 212 can also be coupled to a counting unit (not shown) to receive the current limiting signal SIli and then count it. When the counted number reaches a predetermined value, the current limiting unit 212 generates a protection signal to the first AND gate 202, so as to stop the high side driving unit 230. Otherwise, the protection signal generated by the current limiting unit 212 may be transmitted outside to notify other circuit, but the low side transistor M2 is still turned on to avoid affect the system operating.

In addition, the invention can notify the post-stage converting controller in the current limiting or/and over current situation, such that the converting controller does the corresponding protection. Referring to FIG. 3, the transistor module 200 can add a fault notice unit 240 extra, receiving the limiting signal SIli or/and the protection signal Stu and generating a fault signal Fault to notify the external circuit.

A reverse current prevention unit 220 may be added in the transistor module 200 to prevent a reverse current flowing through the low side transistor M2. A reverse current means that a current flows through the low side transistor M2 from the connecting point pin Phase to the ground pin GND. The reverse current causes not only the unnecessary power consumption in the circuit, but also unstable power output of the circuit. The reverse current prevention unit 220 is coupled to the third end and the fourth end of the low side transistor M2 to do the judgment according to the voltage signal Cs3 and Cs4. When the current flowing through the low side transistor M2 is lower than a reverse current determination value Vcr, the reverse current prevention unit 220 generates a reverse current prevention signal Scr with low level to the second AND gate 204, so as to stop the low side driving unit 235 generating the low side driving signal LG, and such that the low side transistor M2 is turned-off.

Furthermore, the transistor module 200 of the present embodiment can also receive a module selection signal Smode through a module selection pin MODE. When the module selection signal Smode is high level, the low side driving unit 235 operates normally. When the module selection signal Smode is low level, the low side driving unit 235 is stopped the operation. For example, the module selection signal Smode may be low level when the circuit operates under light loading, such that the low side transistor M2 is stopped being switched to reduce the switching loss of the circuit.

By the method of the above current limiting, the current flowing through the transistor is restricted within a current limiting value. Furthermore, when the current cannot be restricted within a current limiting value because of the abnormal condition or any other problems, the circuit stops the switch of the transistors by the method of the over current protection. So, the invention can avoid the burnout of the transistor because of the over current.

As the above description, the invention completely complies with the patentability requirements: novelty, non-obviousness, and utility. It will be apparent to those skilled in the art that various modifications and variations can be made to the structure of the invention without departing from the scope or spirit of the invention. In view of the foregoing descriptions, it is intended that the invention covers modifications and variations of this invention if they fall within the scope of the following claims and their equivalents.

What is claimed is:

1. A transistor driving module, coupled to a converting controller, to drive a high side transistor and a low side transistor connected in series, wherein the high side transistor is coupled to an input voltage and the low side transistor is grounded, the transistor driving module comprising:

a high side driving unit, generating a high side driving signal to turn the high side transistor on according to a duty cycle signal of the converting controller;

a low side driving unit, generating a low side driving signal to turn the low side transistor on according to the high side driving signal;

a current limiting unit, coupled to the high side transistor and the high side driving unit, and generating a current limiting signal when a current flowing through the high side transistor higher than a current limiting value to stop the high side driving unit generating the high side driving signal; and an anti-short through unit, coupled to the high side driving unit and the low side driving unit to control the generations of the high side driving signal and the low side driving signal to have the timings of the high side driving signal and the low side driving signal non-overlapped.

2. The transistor driving module according to claim 1, further including an over current protection unit generating an over current signal when a current flowing through the high side transistor higher than an over current value or a current flowing through the low side transistor higher than an over current value.

3. The transistor driving module according to claim 2, further including an operation suspending unit, coupled to the over current protection unit, and suspending the operations of the over current protection unit within a period of a predetermined suspending time period from the end of the high side driving signal generated by the high side driving unit.

4. The transistor driving module according to claim 2, further including an operation suspending unit, coupled to the over current protection unit, and suspending the operations of the over current protection unit when the low side driving signal is not at high level.

5. The transistor driving module according to claim 2, further including a counting unit, coupled to the over current protection unit and generating a protection signal when a number of the over current signal higher than a predetermined value to stop the operations of the high side driving unit and the low side driving unit.

6. The transistor driving module according to claim 3, further including a counting unit, coupled to the over current protection unit and generating a protection signal when a number of the over current signal higher than a predetermined value to stop the operations of the high side driving unit and the low side driving unit.

7. The transistor driving module according to claim 2, further including a reverse current prevention unit generating a reverse current prevention signal when a current flowing through the low side transistor lower than a reverse current determination value to stop the low side driving unit generating the low side driving signal.

8. The transistor driving module according to claim 1, wherein the transistor driving module stops the operation of the low side driving unit is stopped when receiving a model selection signal.

9. The transistor driving module according to claim 1, further including a fault notice unit, generating a fault signal to notify an external circuit according to the current limiting signal or the over current signal.

10. A transistor module, coupled to an input voltage, to transmitting a power to an output end according to a duty cycle signal of a converting controller, the transistor module comprising:

a high side transistor, including a first end coupled to the input voltage, a second end, and a first control end;

a low side transistor, including a third end coupled to the second end of the high side transistor, a fourth end coupled to a ground, and a second control end;

a high side driving unit, coupled to the first control end of the high side transistor, and generating a high side driving signal to turn the high side transistor on according to the duty cycle signal;

a low side driving unit, coupled to the second control end of the low side transistor, and generating a low side driving signal to turn the low side transistor on according to the high side driving signal;

a current limiting unit, coupled to the first end and the second end of the high side transistor, and generates a current limiting signal when a voltage difference between the first end and the second end higher than a current limiting voltage value to stop the high side driving unit generating the high side driving signal; and an anti-short through unit, coupled to the high side driving unit and the low side driving unit to control the generations of the high side driving signal and the low side driving signal to have the timings of the high side driving signal and the low side driving signal non-overlapped.

11. The transistor module according to claim 10, further including an over current protection unit, generating an over current signal when a voltage difference between the first end and the second end of the high side transistor higher than an over current voltage value.

12. The transistor module according to claim 10, further including an over current protection unit, generating an over current signal when a voltage difference between the third end and the fourth end of the low side transistor higher than an over current voltage value.

13. The transistor module according to claim 12, further including an operation suspending unit, coupled to the over current protection unit, and suspending the operations of the over current protection unit within a period of a predetermined suspending time period from the end of the high side driving signal generated by the high side driving unit.

14. The transistor module according to claim 11, further including a counting unit, coupled to the over current protection unit and generating a protection signal when a number of the over current signal higher than a predetermined value to stop the operations of the high side driving unit and the low side driving unit.

15. The transistor module according to claim 12, further including a counting unit, coupled to the over current protection unit, and generating a protection signal when a number of the over current signal higher than a predetermined value to stop the operations of the high side driving unit and the low side driving unit.

16. The transistor module according to claim 13, further including a counting unit, coupled to the over current protection unit, and generating a protection signal when a number of the over current signal higher than a predetermined value to stop the operations of the high side driving unit and the low side driving unit.

17. The transistor module according to claim 12, further including a reverse current prevention unit, generating a reverse current prevention signal when a voltage difference between the third end and the fourth end of the low side transistor lower than a reverse current determination voltage value to stop the low side driving unit generating the low side driving signal.

18. The transistor module according to claim 10, wherein the transistor module stops the operations of the low side driving unit when receiving a model selection signal.

19. The transistor module according to claim 12, wherein the transistor module stops the operations of the low side driving unit when receiving a model selection signal.

20. The transistor module according to claim 10, further including a fault notice unit generating a fault signal according to the current limiting signal or the over current signal, to notify an external circuit.

21. The transistor module according to claim 11, further including a fault notice unit, generating a fault signal according to the current limiting signal or the over current signal, to notify an external circuit.

* * * * *